A. OOT.
Churn.

No. 162,494.  Patented April 27, 1875.

Witnesses:
A. Moore
Jas. D. Patten

Inventor:
Adam Oot.
By his Attorneys
Stansbury & Munn.

UNITED STATES PATENT OFFICE.

ADAM OOT, OF OSWEGO, NEW YORK.

IMPROVEMENT IN CHURNS.

Specification forming part of Letters Patent No. 162,494, dated April 27, 1875; application filed March 19, 1875.

*To all whom it may concern:*

Be it known that I, ADAM OOT, of Oswego, in the State of New York, have invented a new and useful Improvement in Churns; and I do hereby declare the following to be a full and correct description of the same, reference being had to the accompanying drawings, in which—

Figure 1:
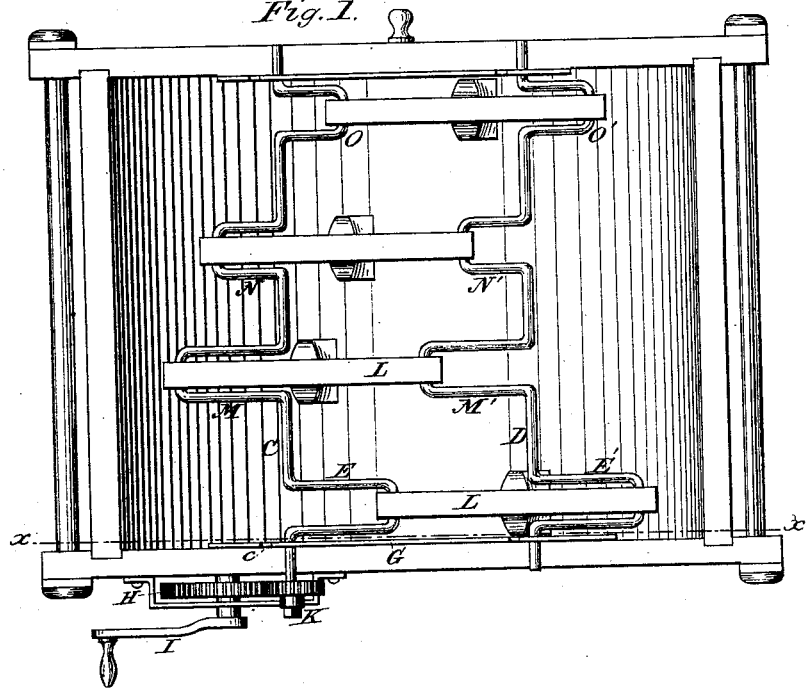
Figure 2:
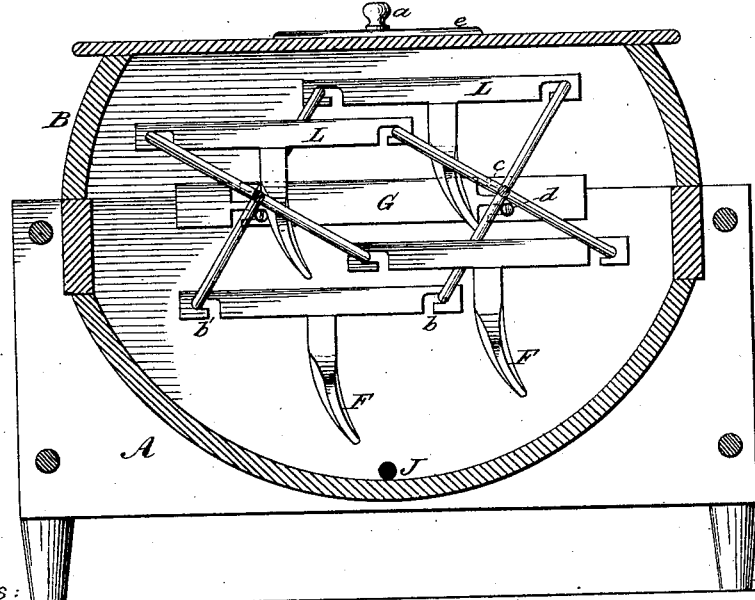

Figure 1 is a top plan view, with the cover removed, and Fig. 2 a vertical section on line $x\ x$ of Fig. 1.

The same letter indicates the same part in both figures.

The invention consists in providing a suitable receptacle for the cream, with a concave bottom, and mounting therein two axles, each provided with four throw-cranks extending at right angles to the length of the axle, the first two on each axle being in the same plane, but in opposite directions, while the planes of each pair are at right angles, and in connecting the cranks opposite on each axle with cross-pieces having curved dashers attached to their under sides. Also, in attaching to the sides of the box or receptacle slides with openings shaped thus ⊔ on their edges for conveniently securing and releasing the axles.

In the drawings, A is a churn-box or receptacle for the cream, mounted in a suitable manner, having a circular or concave bottom, and provided with a cover, B, attached by any suitable means, as shown in Fig. 2, the cover having an opening with a lid, $e$, having a knob, $a$, attached, as shown in the same figure. C and D are two axles, having four throw-cranks on each, as shown in Fig. 1, the first two, E and M, on the axle C, being in the same plane, but in opposite directions, and the second two, N and O, on the same axle, being likewise in the same plane, but in opposite directions, and the planes of each pair being at right angles to each other, as shown in the same figure. The four throw-cranks E′, M′, N′, and O′, on the axle D, are arranged in like manner, and so as to be directly opposite those on the axle C, as shown. L are cross-pieces provided on their under sides and near their ends with hooked-shaped openings by which they connect the opposite throw-cranks, as shown in both figures. F are curved-blade stirrers or dashers attached to the under side of the pieces L, as shown in Fig. 2. G are plates, provided on their edges with opening or slots $c$, shaped thus ⊔, the same distance apart as the axles, those on the under side being arranged to engage with pins $d$, upon which they slide, and those on the upper side to receive and hold in place the ends of the axles. K is a pinion attached to one of the axles, and arranged to engage with a large gear-wheel, H, as shown in Fig. 1. I is a crank to be attached to the axle of either wheel, as desired. J is a hole near the bottom of the churn, provided with a plug for drawing off the liquid.

The operation of the machine thus constructed will be readily understood. The cream is introduced through the opening in the cover; the crank I is then turned, which gives a rapid motion to the dashers, causing them to plunge, one after the other, into the liquid on one side and to be withdrawn on the other. In this way the cream is kept in constant and thorough agitation until the butter is released. The cover B is then removed, and the plates G properly adjusted, when the axles, with their attachments, are removed and the butter gathered in the usual way.

It is obvious that the axles may be connected by machinery so as to be operated by any power convenient.

Having thus described my invention, what I claim, is—

1. The combination of the receptacle A and sliding plates G, with the axles C D, having throw-cranks arranged as shown and described, and connected by cross-pieces L with dashers F, attached as and for the purpose set forth.

2. In a churn, the combination with the axles C and D, provided with throw-cranks, as described, of the cross-pieces L, and dashers F, as set forth.

The above specification of my said invention, signed and witnessed at Minetto, this 11th day of March, A. D. 1875.

ADAM OOT.

Witnesses:
 CHARLES ANDERSON,
 HENRY MCTAMMANY.